United States Patent
Nojima et al.

(10) Patent No.: US 7,600,213 B2
(45) Date of Patent: Oct. 6, 2009

(54) PATTERN DATA VERIFICATION METHOD, PATTERN DATA CREATION METHOD, EXPOSURE MASK MANUFACTURING METHOD, SEMICONDUCTOR DEVICE MANUFACTURING METHOD, AND COMPUTER PROGRAM PRODUCT

(75) Inventors: Shigeki Nojima, Yokohama (JP); Akira Hamaguchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 259 days.

(21) Appl. No.: 11/287,205

(22) Filed: Nov. 28, 2005

(65) Prior Publication Data
US 2006/0136862 A1 Jun. 22, 2006

(30) Foreign Application Priority Data
Nov. 29, 2004 (JP) ............... 2004-344242

(51) Int. Cl.
*G06F 17/50* (2006.01)
(52) U.S. Cl. ............... 716/21; 716/19; 716/20; 430/5; 430/30
(58) Field of Classification Search ............ 716/19–21; 430/5, 30
See application file for complete search history.

(56) References Cited

U.S. PATENT DOCUMENTS 5,889,686 A * 3/1999 Mimotogi et al. ............ 716/19
6,449,386 B1 9/2002 Nakao
6,470,489 B1 10/2002 Chang et al.
6,633,203 B1 * 10/2003 Joe ............................ 331/173

FOREIGN PATENT DOCUMENTS

| JP | 09055352 | * | 2/1997 |
| JP | 9-319067 | | 12/1997 |
| JP | 2003-107664 | | 4/2003 |

OTHER PUBLICATIONS

Belledent, et al., "Critical failure ORC—Application to the 90-nm and 65-nm nodes", Proceedings of SPIE, vol. 5377, pp. 1184-1197, (2004).
D. Newmark et al., "Large Area Optical Proximity Correction using Pattern Based Corrections," SPIE (1994), 2322::374-386.

* cited by examiner

*Primary Examiner*—Thuan Do
*Assistant Examiner*—Nghia M Doan
(74) *Attorney, Agent, or Firm*—Finnegan, Henderson, Farabow, Garrett & Dunner, L.L.P.

(57) ABSTRACT

A pattern data verification method includes preparing exposure data related to a circuit pattern to be formed on a substrate, calculating a characteristic of an image of an exposure pattern on a resist film to be applied on the substrate, the exposure pattern corresponding to the exposure data, calculating a film thickness of the resist film after being developed based on the characteristic of the image of the exposure pattern, and determining whether the exposure data is acceptable or rejectable based on the film thickness of the resist film after being developed.

16 Claims, 6 Drawing Sheets

PATTERN DATA VERIFICATION METHOD, PATTERN DATA CREATION METHOD, EXPOSURE MASK MANUFACTURING METHOD, SEMICONDUCTOR DEVICE MANUFACTURING METHOD, AND COMPUTER PROGRAM PRODUCT

CROSS-REFERENCE TO RELATED APPLICATIONS

This application is based upon and claims the benefit of priority from prior Japanese Patent Application No. 2004-344242, filed Nov. 29, 2004, the entire contents of which are incorporated herein by reference.

BACKGROUND OF THE INVENTION

1. Field of the Invention

The present invention relates to a pattern data verification method, a pattern data creation method, an exposure mask manufacturing method, a semiconductor device manufacturing method, and a computer program product that are employed in a lithographic process.

2. Description of the Related Art

The progress in the semiconductor manufacturing technology in recent years is extremely remarkable, and semiconductor device having a size minimum of 70 nm is produced in large quantities. The miniaturization of semiconductor device is realized by rapid progress in fine pattern forming technology such as a mask process technology, an optical lithography technology, an etching technology, and the like.

In the days when pattern sizes have been sufficiently large, a pattern nearly same as the design pattern can be formed on the wafer by drawing a plane shape of a desired integrated circuit as a design pattern on a mask pattern, preparing a mask pattern which is faithful to the design pattern, transferring the mask pattern on the wafer by a projective optical system, and etching an underlying layer.

However, as the miniaturization of semiconductor device and integration of integrated circuit increase, forming the pattern faithfully is getting difficult in each process. As a result, the problem that a final finished dimension is not made to be as the same as a design pattern has been brought about.

One of the reasons for the above-described problem is that a layout disposition of other patterns disposed at the periphery of a desired pattern greatly affects a dimensional precision of the desired pattern in lithography and etching processes which are most important for achieving fine processing.

Then, mask correction technologies such as an optical proximity correction (OPC) and a process proximity correction (PPC) is developed in order to avoid those influences.

The aforementioned mask correction technologies are to add an auxiliary pattern in advance such that a dimension after processing is made to be a design pattern (desired value), or to make a width of a pattern broad or narrow (Jpn. Pat. Appln. KOKAI Publication No. 2003-107664, SPIE Vol. 2322 (1994) 374 (Large Area Optical Proximity Correction using Pattern Based Correction, D. M. Newmark et. al). In accordance therewith, it is possible to form an integrated circuit pattern which a designer has drawn on a wafer.

When the mask correction technologies are used, a technology for verifying validity of the correction is required. As this kind of technology, there is a method which verifies properness of correction based on a mask value. To carry out this method exactly, it is indispensable to use a (lithography) simulator.

To carry out a method that uses such a simulator, a verification tool is proposed. The verification tool compares an edge of a desired pattern on a wafer with an edge of a pattern transferred using a post OPC layout so that a difference between the two may be checked on whether it is in a predetermined tolerance (see Specification of U.S. Pat. No. 6,470,489).

Another method is proposed to highly accurately predict a displacement between an edge of a desired pattern and an edge of a transferred pattern by using proximity correction and a verification physical model (see Jpn. Pat. Appln. KOKAI Publication No. 09-319067).

These presently proposed methods grasp design data such as a line width, a space width, and a shortening quantity of a line edge in terms of a planar dimension (area) and are effective to detect an abnormal value of the line width.

On the other hand, to secure exposure latitude against the progressing miniaturization, a resist film used in an exposure process has been made thinner. The exposure latitude is an index for ensuring the predetermined allowable line width even if a dispersion in focus or exposure amount which are assumed to be occurred in an exposure apparatus or the like.

When a member (e.g., insulation film, conductive film, or semiconductor film) under a resist film is etched, the resist film is also etched. Therefore, if an initial resist film is too thin, such a problem occurs that the resist film may disappear before the etching finishes.

A thickness of developed resist film varies with exposure conditions or a layout of patterns around the resist film. Accordingly, recently there has been increasing needs for a technology to detect a pattern which may cause a problem due to a thin resist film, based on overall design data (whole patterns). However, presently such technology is not available.

BRIEF SUMMARY OF THE INVENTION

According to an aspect of the present invention, there is provided a pattern data verification method comprising: preparing exposure data related to a circuit pattern to be formed on a substrate; calculating a characteristic of an image of an exposure pattern on a resist film to be applied on the substrate, the exposure pattern corresponding to the exposure data; calculating a film thickness of the resist film after being developed based on the characteristic of the image of the exposure pattern; and determining whether the exposure data is acceptable or rejectable based on the film thickness of the resist film after being developed.

According to an aspect of the present invention, there is provided a pattern data creation method comprising: preparing design data related to a circuit pattern to be formed on a substrate; applying proximity effect correction to the design data; verifying post proximity effect correction data obtained by applying the proximity effect correction to the design data, comprising calculating a characteristic of an image of an exposure pattern on a resist film to be applied on the substrate, the exposure pattern corresponding to the post proximity effect correction data, calculating a film thickness of the resist film after being developed based on the characteristic of the image of the exposure pattern, and determining whether the post proximity effect correction data is acceptable or rejectable based on the film thickness of the resist film after being developed; saving the post proximity effect correction data in a case where the post proximity effect correction data is determined to be acceptable in the verifying the post proximity effect correction data; and correcting the design data related to the circuit pattern or applying the proximity effect correction to the design data by changing a parameter related to the proximity effect correction or saving the post proximity effect correction data determined to be rejectable in a case where the post proximity effect correction data is determined to be rejectable in the verifying the post proximity effect correction data.

According to another aspect of the present invention, there is provided a pattern data creation method comprising: preparing design data related to a circuit pattern to be formed on a substrate; and applying proximity effect correction to the design data, comprising calculating a characteristic of an image of an exposure pattern on a resist film to be applied on the substrate and, the exposure pattern corresponding to post proximity effect correction data obtained by applying the proximity effect correction to the design data, calculating a film thickness of the resist film after being developed based on the characteristic of the image of the exposure pattern, determining whether the post proximity effect correction data is acceptable or rejectable based on the film thickness of the resist film after being developed, saving the post proximity effect correction data in a case where the post proximity effect correction data is determined to be acceptable, and applying the proximity effect correction to the design data by changing a parameter related to the proximity effect correction or saving the post proximity effect correction data determined to be rejectable in a case where the post proximity effect correction data is determined to be rejectable.

According to an aspect of the present invention, there is provided an exposure mask manufacturing method comprising: preparing post proximity effect correction data determined to be acceptable, the post proximity effect correction data being obtained by pattern data creation method of an aspect of the present invention; exposing a resist film applied on a substrate based on the post proximity effect correction data; developing the exposed resist film; and etching the substrate using the resist film left after the developing as a mask.

According to another aspect of the present invention, there is provided an exposure mask manufacturing method comprising: preparing post proximity effect correction data determined to be acceptable, the post proximity effect correction data being obtained by pattern data creation method of another aspect of the present invention exposing a resist film applied on a substrate based on the post proximity effect correction data; developing the exposed resist film; and etching the substrate using the resist film left after the developing as a mask.

According to an aspect of the present invention, there is provided a semiconductor device manufacturing method comprising: forming a resist pattern on a substrate including a wafer by lithographic process using an exposure mask, the mask being manufactured by exposure mask manufacturing method of an aspect of the present invention; and forming a pattern by etching the substrate using the resist pattern as a mask.

According to an aspect of the present invention, there is provided a semiconductor device manufacturing method comprising: forming a resist pattern on a substrate including a wafer by lithographic process using an exposure mask, the mask being manufactured by exposure mask manufacturing method of another aspect of the present invention; and forming a pattern by etching the substrate using the resist pattern.

According to an aspect of the present invention, there is provided a computer program product configured to store program instructions for execution on a computer system enabling the computer system to perform: an instruction to prepare exposure data related to a circuit pattern to be formed on a substrate; an instruction to calculate a characteristic of an image of an exposure pattern on a resist film to be applied on the substrate, the exposure pattern corresponding to the exposure data; an instruction to calculate a film thickness of the resist film after being developed based on the characteristic of the image of the exposure pattern; an instruction to determine whether the exposure data is acceptable or rejectable based on the film thickness of the resist film after being developed; and an instruction to save a result of the instruction to determine whether the exposure data is acceptable or rejectable.

According to an aspect of the present invention, there is provided a computer program product configured to store program instructions for execution on a computer system enabling the computer system to perform: an instruction to prepare design data related to a circuit pattern to be formed on a substrate; an instruction to apply proximity effect correction to the design data; an instruction to verify post proximity effect correction data obtained by applying the proximity effect correction to the design data, comprising calculating a characteristic of an image of an exposure pattern on a resist film to be applied on the substrate, the exposure pattern corresponding to the post proximity effect correction data, calculating a film thickness of the resist film after being developed based on the characteristic of the image of the exposure pattern, and determining whether the post proximity effect correction data is acceptable or rejectable based on the film thickness of the resist film after being developed; an instruction to save the post proximity effect correction data in a case where the post proximity effect correction data is determined to be acceptable in the verifying the post proximity effect correction data; and an instruction to correct the design data related to the circuit pattern or applying the proximity effect correction to the design data by changing a parameter related to the proximity effect correction or saving the post proximity effect correction data determined to be rejectable in a case where the post proximity effect correction data is determined to be rejectable in the verifying the post proximity effect correction data.

According to an aspect of the present invention, there is provided a computer program product configured to store program instructions for execution on a computer system enabling the computer system to perform: an instruction to prepare design data related to a circuit pattern to be formed on a substrate; and an instruction to apply proximity effect correction to the design data, comprising calculating a characteristic of an image of an exposure pattern on a resist film to be applied on the substrate and, the exposure pattern corresponding to post proximity effect correction data obtained by applying the proximity effect correction to the design data, calculating a film thickness of the resist film after being developed based on the characteristic of the image of the exposure pattern, determining whether the post proximity effect correction data is acceptable or rejectable based on the film thickness of the resist film after being developed, saving the post proximity effect correction data in a case where the post proximity effect correction data is determined to be acceptable, and applying the proximity effect correction to the design data by changing a parameter related to the proximity effect correction or saving the post proximity effect correction data determined to be rejectable in a case where the post proximity effect correction data is determined to be rejectable.

DETAILED DESCRIPTION OF THE INVENTION

The following will describe embodiments of the present invention with reference to drawings.

FIRST EMBODIMENT

Figure 1:
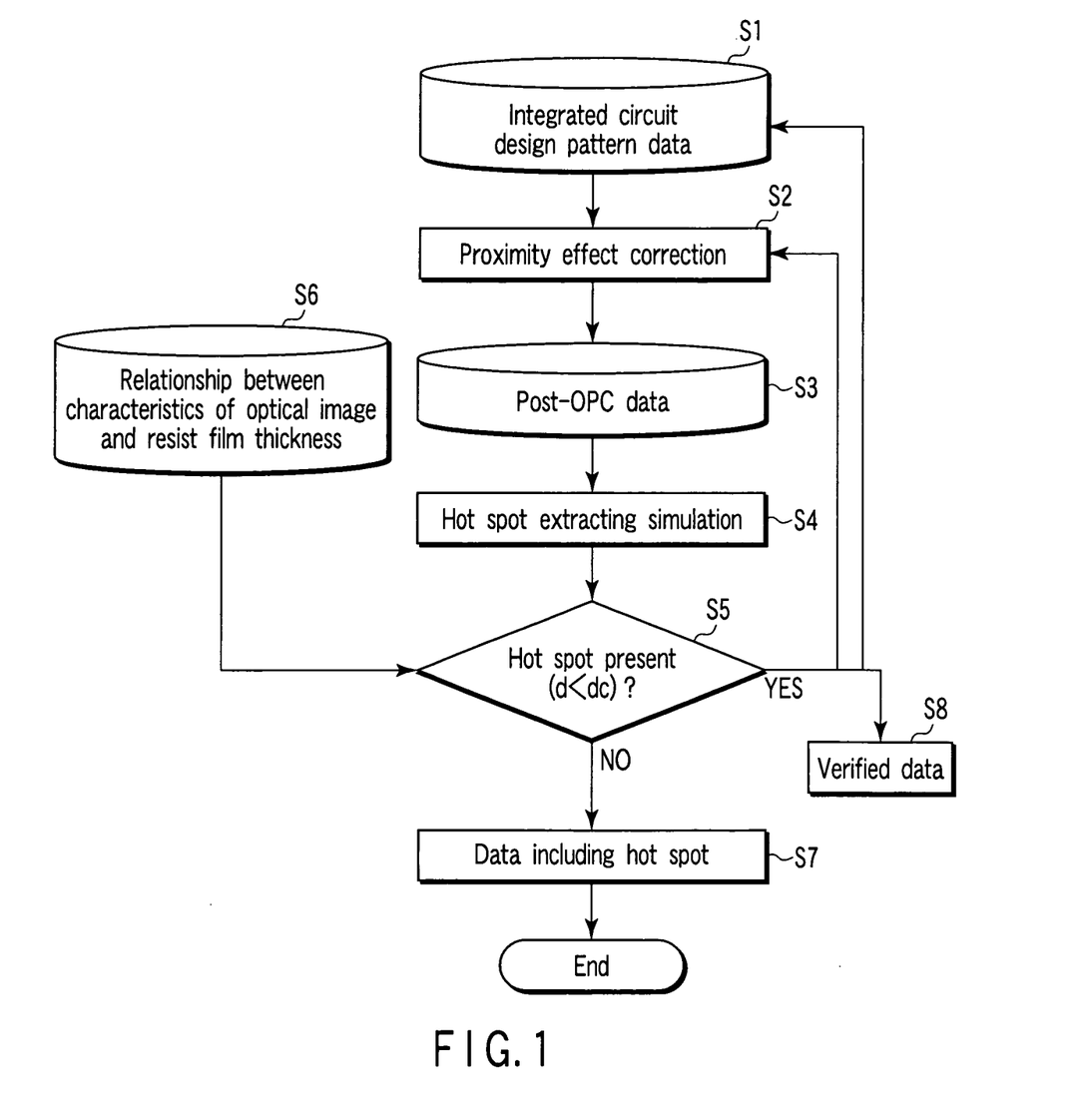
FIG. 1 is a flowchart showing an integrated circuit pattern data creation method according to a first embodiment.

FIG. 1 is a flowchart showing an integrated circuit pattern data creation method according to a first embodiment of the present invention.

First, design data (integrated circuit design pattern data), which is related to an integrated circuit pattern to be formed on a substrate, is prepared (step S1).

This substrate is, for example, a silicon wafer. Further, the integrated circuit design pattern data may have been generated beforehand in some cases or will be generated newly in other cases.

Next, optical proximity correction (OPC) is applied to the integrated circuit design pattern data (step S2), data (post OPC data) including the integrated circuit design pattern data and mask correction related data) is generated (step S3).

OPC basically involves correction aimed at a critical dimension (CD). The OPC aimed at CD may be rule based OPC or model based OPC.

In the case of rule based OPC, such a correction that an edge is shifted by a predetermined distance according to a distance between a pattern and its adjacent pattern. On the other hand, in the case of model based OPC, a difference between CD of integrated circuit pattern data acquired through simulation and CD of integrated circuit design pattern data kept to a constant value or less.

Here, the OPC is performed as a mask correction to the integrated circuit design pattern data, however, process proximity correction (PPC) may be performed in addition to the OPC. Further, any other mask correction may be performed.

The present embodiment is described with reference to a case where exposure data is design data, the exposure data may be data on which correction such as OPC has been applied beforehand. In this case, step S2 is omitted.

Next, simulation is performed to extract a hot spot (risky place) by using the post proximity correction data as an input (step S4). The hot spot is alternatively called a hot spot.

The hot spot refers to a place (point) in a pattern that is not formed on the substrate as desired (as designed).

In the simulation, conventionally such a method has been performed that post OPC data (CD) may be compared to design data (planar information such as line width, space width area, and shortening quantity of a line edge) to thereby extract a place (hot spot) where a difference between the two is a constant value or larger.

In contrast, the present embodiment employs a method of exacting a hot spot based on a characteristic of an image of an exposure pattern that corresponds to post OPC data (exposure data) on a resist film.

Since in the case of exposure by light is described here, an image of an exposure pattern that corresponds to post OPC data on the resist film is an optical image, that is, an intensity distribution of exposure light (light intensity distribution) on the resist film. In the case of exposure by electron beams, the image is an intensity distribution of electron beams on the resist film.

Figure 2:
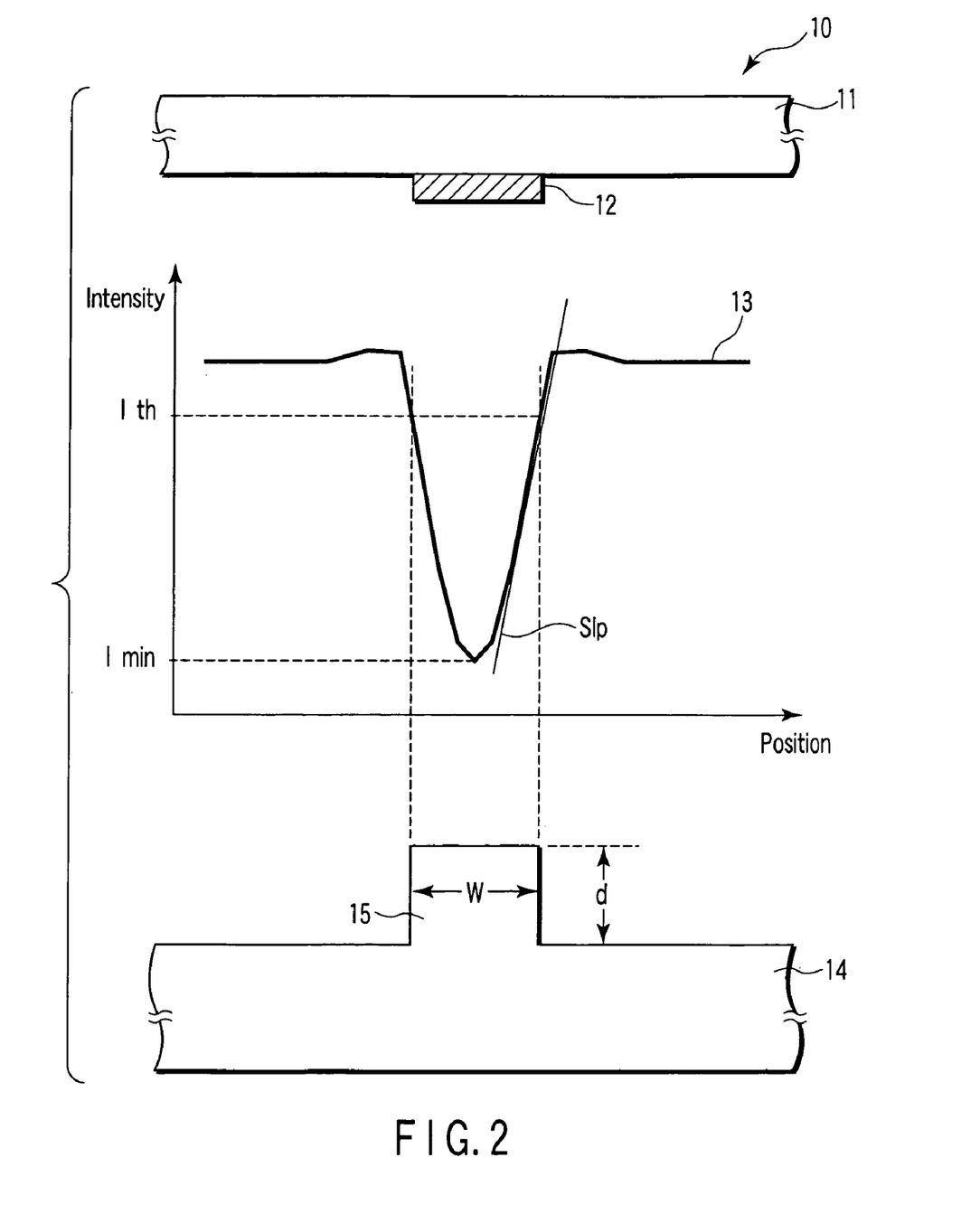
FIG. 2 is an explanatory illustration of an index that is used by a hot spot extraction method of the embodiment.
Figure 3:
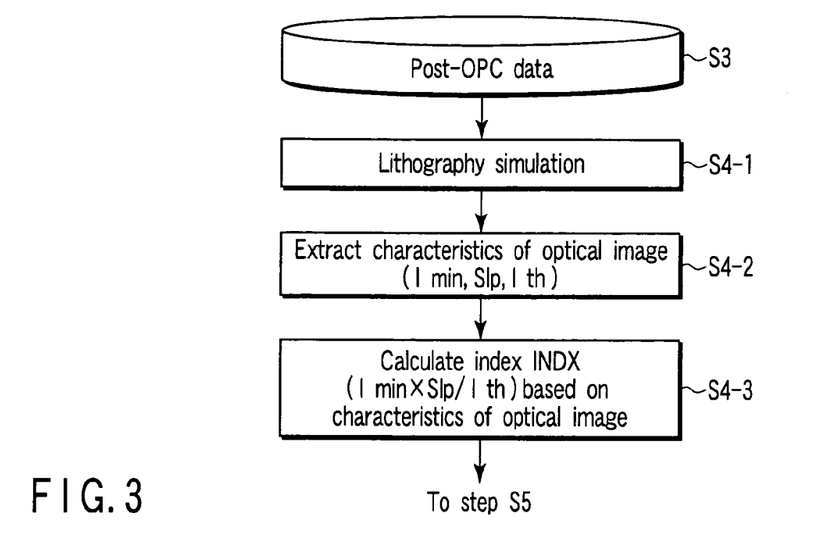
FIG. 3 is a flowchart showing a detail of step S4 of the embodiment.

The following will specifically describe the method of extracting the hot spot according to the present embodiment, with reference to FIGS. 2 and 3.

In FIG. 2, a reference number 10 indicates an exposure mask. The exposure mask 10 includes a glass substrate 11 and a light shielding pattern 12 provided on the glass substrate 11. A material of the light shielding pattern 12 is, for example, chromium (Cr).

Light emitted from an exposure light source passes through the exposure mask 10. The resist film is irradiated with the light that has passed through the exposure mask 10. A reference number 13 indicates a distribution of an intensity of the light which has passed through the exposure mask 10 on the resist film (light intensity distribution).

After having been irradiated with the light, the resist film is developed. A reference number 14 indicates the resist film after the developing (resist pattern). A reference symbol d indicates a thickness of the resist film left unsolved (pattern portion) 15 after the developing (pattern film thickness).

The pattern film thickness d decreases as a minimum value of an image of the light (optical image) irradiated on the resist film corresponding to the pattern portion 15, that is, a minimum value Imin of the light intensity distribution 13 is decreased. It is because of the fact that the smaller the minimum value Imin is, the more the light intensity distribution 13 extends vertically in the figure to increase its own area, thus resulting in a larger quantity of light with which the pattern portion 15 is irradiated.

Further, the pattern film thickness d increases as a width W of the pattern portion 15 increases. It is because of the fact that the larger the width W is, the more the light intensity distribution 13 extends horizontally in the figure to increase its own area, thus resulting in a larger quantity of light with which the pattern portion 15 is irradiated.

Here, as shown in FIG. 2 the width W of the pattern portion 15 can be replaced by a threshold value Ith that is set to an intensity of light on the resist film.

Further, the pattern film thickness d increases as a slope (Slp) of a curve of the light intensity distribution 13 increases. It is because of the fact that the larger the slope Slp is, the more the light intensity distribution 13 extends horizontally in the figure to increase its own area, thus resulting in a larger quantity of light with which the pattern portion 15 is irradiated.

Here, the slope Slp is tangent of the curve of the light intensity distribution 13 at a position corresponding to the threshold value Ith, however, the definition of the slope Slp is not limited to it.

An index INDX that indicates the pattern film thickness d can be given by the following equation (1) by using the minimum value Imin, the threshold value Ith (line width W), and the slope Slp, which are characteristics of the light intensity distribution 13 (parameters of characteristics of the light intensity distribution 13):

$$INDX = Imin \times Slp / Ith \quad (1)$$

The index INDX is obtained for each of a variety of patterns including a L&S pattern and a contact hole (CH) pattern. Further, it is obtained for each of dimensions for the same kind of patterns. For example, in the case of the L&S pattern, the index INDX is obtained for each of different line widths and space widths.

Here, the index INDX is described in the case of light exposure, it can be obtained similarly also in the case of electron beam (EB) exposure.

FIG. 3 is a flowchart of a simulation of step S4 considering the mentioned above.

Conventional lithography simulation is performed by using the post OPC data acquired at step S3, as an input (step S4-1), characteristics (minimum value Imin, threshold value Ith, and slope Slp) of the optical image is extracted (step S4-2). The lithography simulation is performed based on a numerical aperture (NA), a coherence factor σ, and an orbicular shield factor. For example, NA=0.68, σ=0.75, and the orbicular shield factor=2/3ann. Thereafter, the index INDX of the pattern film thickness d is calculated based on the characteristics of the optical image and equation (1) (step S4-3).

Getting back, after the simulation in the step S4 is performed, the step for determining whether the hot spot is exist or not is performed based on a result of the simulation in the step S4 (step S5).

Specifically, a previously created table containing a relationship between the index INDX and the pattern film thickness is referred to (step S6), a pattern film thickness d that corresponds to an index INDX calculated at step S4 is acquired, further, the acquired pattern film thickness d is compared to a predetermined critical film thickness dc (reference value). In the result, in a case of d<dc, a place that corresponds to the pattern film thickness d is determined as the hot spot (rejectable), and, in a case of d≧dc, the place that corresponds to the pattern film thickness d is determined as the normal place (acceptable).

The critical film thickness dc is defined as, for example, a film thickness determined with respect to a thickness (initial film thickness) of resist film before being developed, a minimum required thickness of the resist film that will not lost during etching, or a minimum required thickness of the resist film to obtain a desired etched shape. The critical film thickness dc is, for example, ⅔ of the film thickness of the resist film before being developed (initial film thickness).

In the result of the step S5, if the hot spot is judged to exist, it returns to step S1 to correct (modify) the integrated circuit design pattern data or returns to step S2 to perform the proximity correction with changed the parameters. Such correction is basically repeated until hot spot is judged not to exist in the step S5.

However, when the hot spot remains even if the correction is repeated a certain number of times, no more correction is performed, and information for the hot spot is added to the post proximity correction data, then data including hot spot (hot spot information+post proximity correction data) is created and saved (step S7). Alternatively, the integrated circuit design pattern data is abandoned.

On the contrary, as the result of the step S5, if the hot spot is judged not to exist, it is saved as the post proximity correction data without hot spot (verified data) (step S8).

According to the present embodiment, it is possible to realize a pattern data creation method that enables correcting pattern data corresponding to a pattern that has a hot spot in a height direction (film thickness direction). Thereby, exposure pattern data that enables improving an accuracy of coincidence between a design pattern of a circuit to be formed on a substrate and a resist pattern is obtained.

Figure 7A:
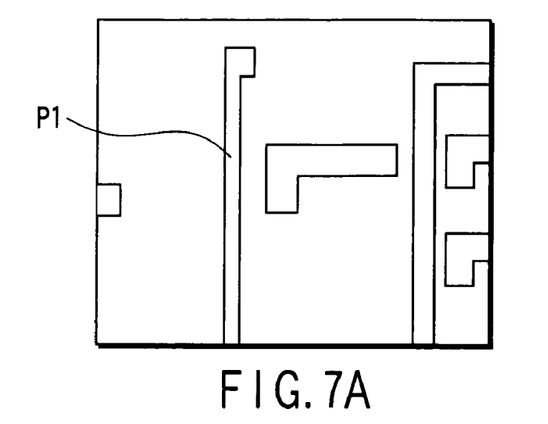
FIGS. 7A and 7B are specific illustrations of an integrated circuit pattern that is extracted by step S4 of the first embodiment and its index.
Figure 7B:
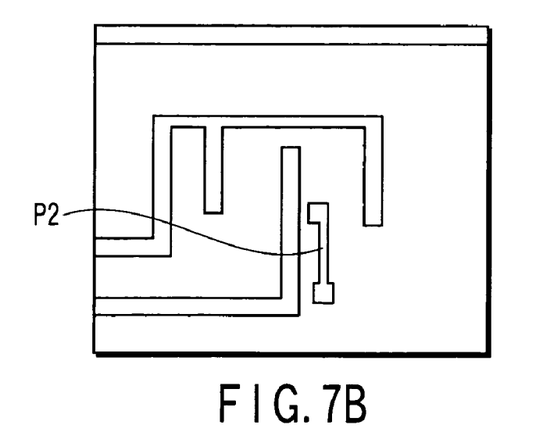

FIGS. 7A and 7B show specific examples of a pattern in the integrated circuit extracted in the step S4 and its index INDX.

The index INDX of a pattern P1 of FIG. 7A is 1.24 and that of a pattern P2 of FIG. 7B is 2.12. Since the index of the pattern P2 is larger than that of the pattern P1, a film thickness of the pattern P2 is predicted to be smaller than that of the pattern P1. In the cases of FIGS. 7A and 7B, when the index INDX exceeds 2.00, it is determined as the hot spot in the step S5. Therefore, the pattern P2 is determined as the hot spot in the step S5. Actually, the patterns P1 and P2 measured 135 nm and 72 nm in film thickness. The film thickness of 72 nm causes a trouble in forming integrated circuit pattern, thus adequacy of the method of the present embodiment is confirmed.

It is to be noted that an integrated circuit pattern data verification method of an embodiment of the present invention is obtained by omitting integrated circuit design pattern data correction (modification) and proximity correction that are performed when the hot spot is judged to exist in the step S5 from the integrated circuit pattern data creation method of the present embodiment. That is, the verification method determines whether post proximity correction data is acceptable or rejectable but does not perform the correction for eliminating the hot spot. By the verification method, it is possible to verify pattern data that corresponds to a pattern including the hot spot in a direction of height (film thickness direction).

SECOND EMBODIMENT

Figure 4:
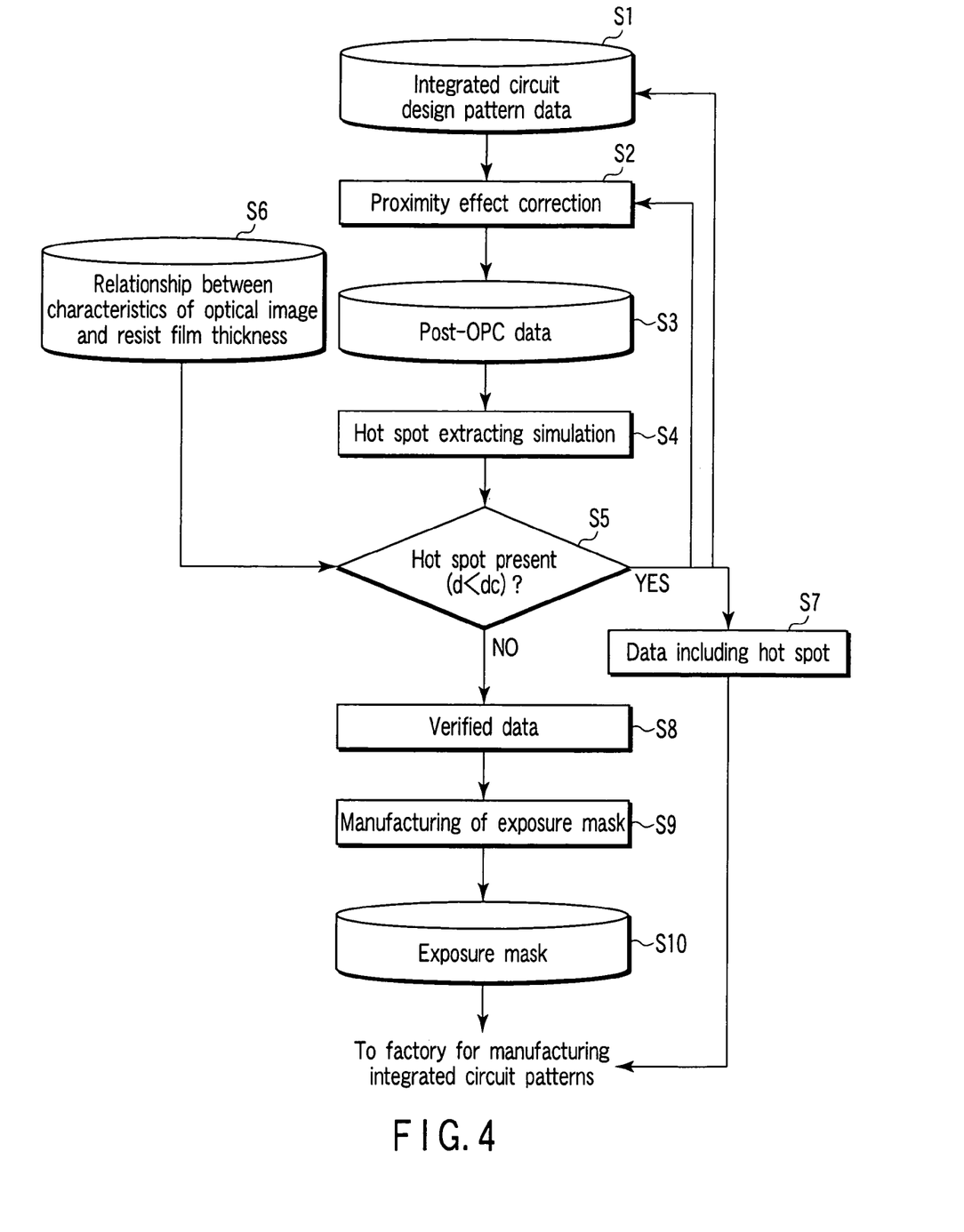
FIG. 4 is a flowchart showing an exposure mask manufacturing method according to a second embodiment.

FIG. 4 is a flowchart showing an exposure mask manufacturing method according to a second embodiment. It is to be noted that components corresponding to those of FIG. 1 are indicated by the same reference symbols as those of FIG. 1 and their detailed explanation is not described.

First, steps S1 to S5 are performed as in the case of the first embodiment.

If it is determined at step S5 that there is no hot spot, an exposure mask is manufactured based on verified data (step S9), and the exposure mask is obtained (step S10).

The exposure mask manufacturing method (step S9) includes a step of preparing the verified data (step S8) that is saved based on a result of verification (step S5), a step of exposing a resist film applied on a substrate based on the verified data, a step of developing the exposed resist film, and a step of etching the substrate by using the resist film left after the development as a mask.

The substrate includes, for example, a glass substrate and a light shielding film provided on the glass substrate. In this case, the step of etching the substrate involves etching the light shielding film. As a result, a mask comprising the glass substrate and the light shielding pattern provided on the glass substrate is obtained.

Thereafter, the exposure mask is delivered to a factory (device manufacturer) that manufactures integrated circuit patterns. The device manufacturer manufactures a semiconductor device including the integrated circuit patterns by using the exposure mask.

On the other hand, when it is determined at step S5 that there is the hot spot and data including the hot spot is created, the data including the hot spot is delivered to the factory (device manufacturer) that manufactures integrated circuit patterns. In this case, the device manufacturer refers to hot spot information contained in the data including the hot spot, and eliminates the hot spot, which is not eliminated by mask process, by manufacturing process.

According to the present embodiment, an accuracy of coincidence between a design pattern of a circuit to be formed on the substrate and the resist pattern is improved as the exposure mask can be formed based on pattern data (verified data) that has been corrected in terms of pattern data corresponding to a pattern including the hot spot in a direction of height (film thickness direction).

THIRD EMBODIMENT

Figure 5:
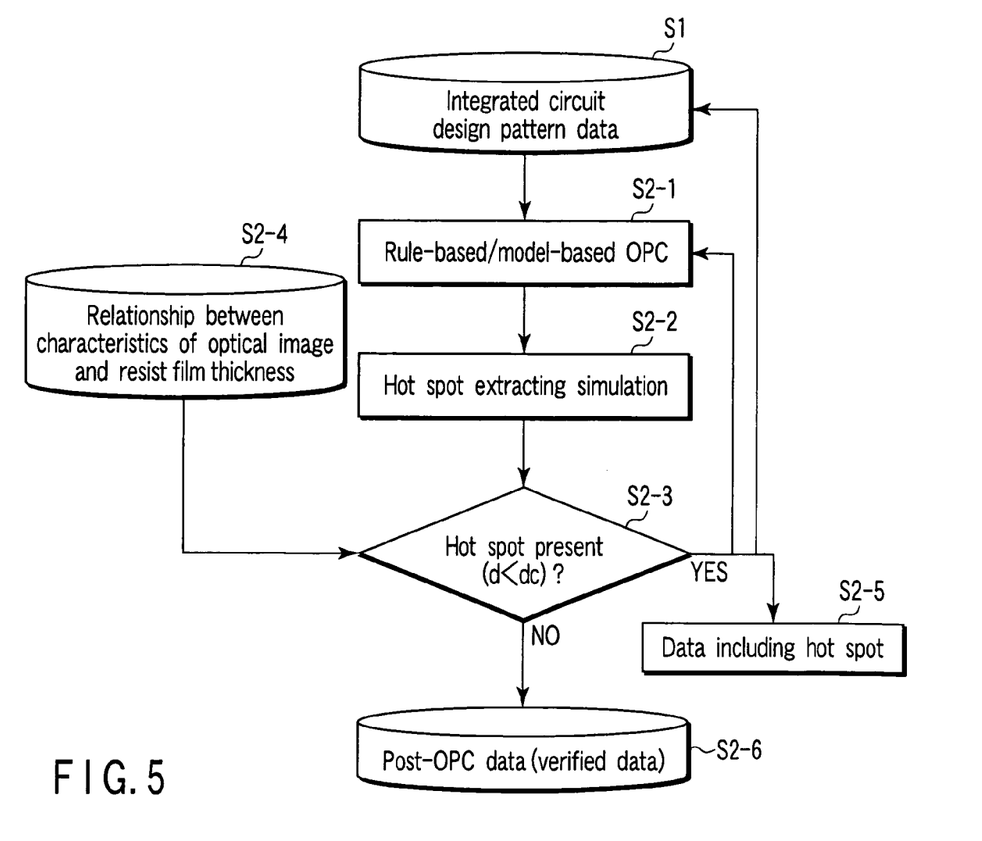
FIG. 5 is a flowchart showing an integrated circuit pattern data creation method according to a third embodiment.

FIG. 5 is a flowchart showing an integrated circuit pattern data creation method according to a third embodiment.

The creation method of the present embodiment includes OPC and the processing step of the hot spot of the first embodiment. That is, the correction method of the present embodiment incorporates the hot spot extraction and correction steps of the first embodiment into the conventional OPC. It is thus possible to eliminate the hot spot at the step of correction of design pattern data.

First, integrated circuit design pattern data is prepared (step S1) and rule based OPC or model based OPC is applied to the integrated circuit design pattern data (step S2-1).

Next, the integrated circuit design pattern data on which OPC has been applied is used as an input to thereby perform simulation to extract the hot spot (target place to verify) (step S2-2). Since step S2-2 is the same as step S4 of the first embodiment, details of step S2-2 are not described.

Next, it is determined whether there is the hot spot or not based on a result of the simulation (steps S2-3, S2-4). Since steps S2-3 and S2-4 are the same as steps S5 and S6 of the first embodiment, details of the steps S2-3 and S2-4 are not described.

As the result of step S2-3, if the hot spot is judged to exist, it returns to step S1 to correct (modify) the integrated circuit design pattern data or returns to step S2-1 to perform the OPC with changed the parameters. In the step S2-1, when the rule based OPC is performed, correction which moves an edge in a direction that the pattern film thickness d of FIG. 2 does not decrease is performed. Basically, the edge is moved in a direction that a width (area) of a light shielding pattern 12 increases.

The correction or OPC of the integrated circuit design pattern data is basically repeated until hot spot is judged not to exist in the step S2-3.

However, when the hot spot remains even if the correction is repeated a certain number of times, no more correction is performed, and information for the hot spot is added to the post proximity correction data, then data including hot spot (hot spot information+post proximity correction data) is created and saved (step S2-5). Alternatively, the integrated circuit design pattern data is abandoned.

On the contrary, as the result of the step S2-3, if the hot spot is judged not to exist, it is saved as the post proximity correction data without hot spot (verified data) (step S2-6).

According to the present embodiment, it is possible to realize a pattern data creation method that enables correcting pattern data corresponding to a pattern that has a hot spot in a height direction (film thickness direction) at a step of OPC, thereby, exposure pattern data that enables improving an accuracy of coincidence between a design pattern of a circuit to be formed on a substrate and a resist pattern is obtained.

FOURTH EMBODIMENT

Figure 6:
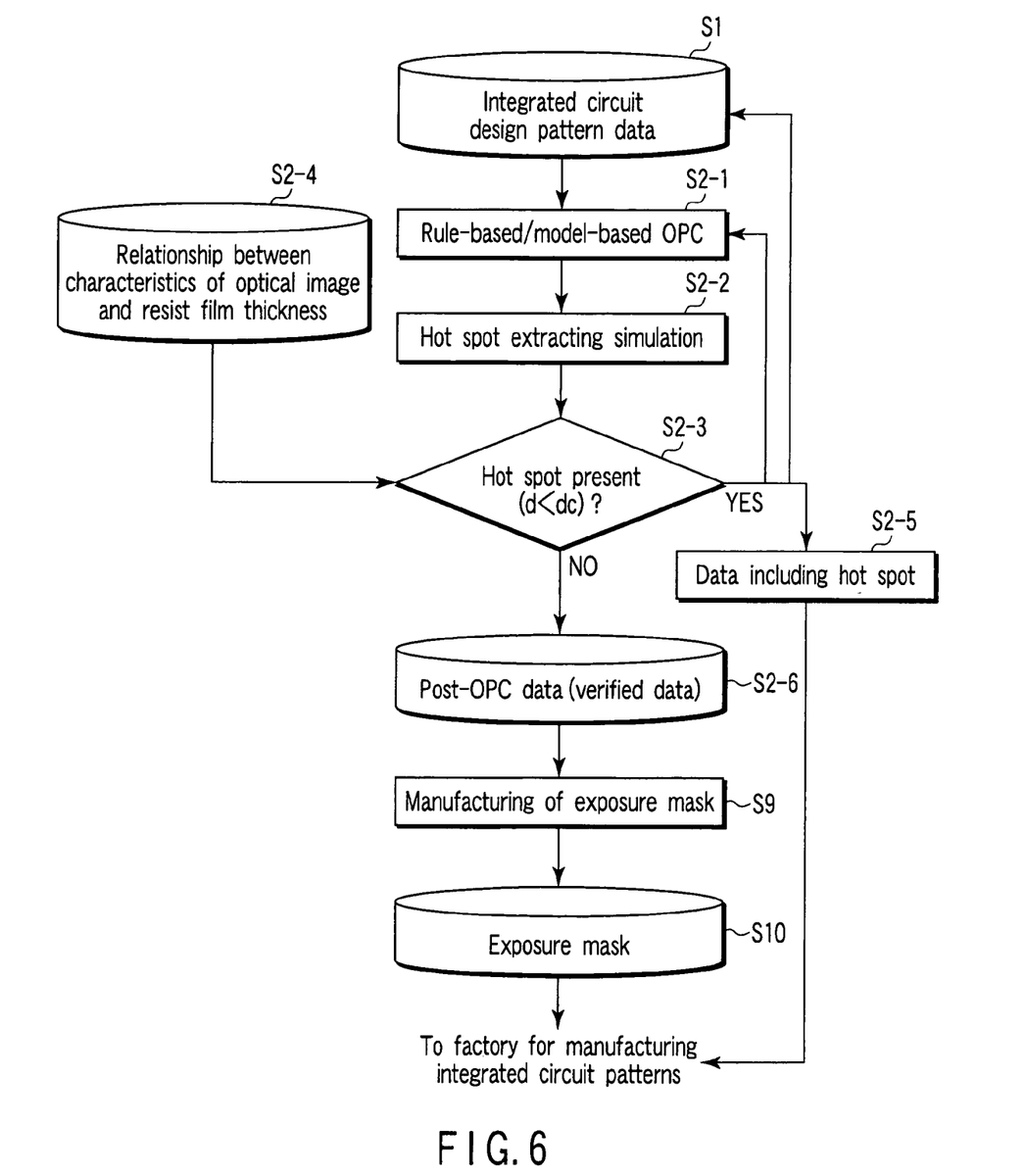
FIG. 6 is a flowchart showing an exposure mask manufacturing method according to a fourth embodiment.

FIG. 6 is a flowchart showing an exposure mask manufacturing method according to a fourth embodiment. It is to be noted that components corresponding to those of FIGS. 1 and 5 are indicated by the same reference symbols as those of FIGS. 1 and 5 and their detailed explanation is not described.

First, steps S1 to S2-3 are performed as in the case of the third embodiment.

If it is determined at step S2-3 that there is no hot spot, an exposure mask is manufactured based on the post proximity correction data (verified data) (step S9), and the exposure mask is obtained (step S10).

Thereafter, the exposure mask is delivered to a factory (device manufacturer) that manufactures integrated circuit patterns. The device manufacturer manufactures a semiconductor device including the integrated circuit patterns by using this exposure mask.

On the other hand, when it is determined at step S2-3 that there is the hot spot and data including the hot spot is created, the data including the hot spot is delivered to the factory (device manufacturer) that manufactures integrated circuit patterns. In this case, the device manufacturer refers to hot spot information contained in the data including the hot spot, and eliminates the hot spot, which is not eliminated by mask process, by manufacturing process.

According to the present embodiment, an accuracy of coincidence between a design pattern of a circuit to be formed on the substrate and the resist pattern is improved as the exposure mask can be formed based on pattern data (verified data) that has been corrected in terms of pattern data corresponding to a pattern including the hot spot in a direction of height The following will describe a semiconductor device manufacturing method of the present embodiment.

The semiconductor device manufacturing method of the present embodiment manufactures a semiconductor device by using a mask obtained by an exposure mask manufacturing method of the embodiment. Specifically, it is as follows.

First, a resist film is applied to a substrate including a semiconductor substrate. The semiconductor substrate is, for example, a silicon substrate or an SOI substrate.

Next, by using an exposure apparatus and the mask, a pattern corresponding to the mask is transferred onto the resist film. Thereafter, by developing the resist film, a resist pattern is formed.

Next, by etching the substrate by using the resist pattern as a mask, a pattern is formed on the substrate.

Here, in a case where an underlying layer (top layer of the substrate) of the resist film is a polycrystalline silicon film or a metal film, for example, an electrode pattern or an interconnection pattern is formed.

If the underlying layer of the resist is an insulation film, for example, a fine contact hole pattern or a gate insulation film is formed.

If the underlying layer of the resist is the semiconductor substrate, for example, an isolation trench (STI) is formed.

Figure 8:
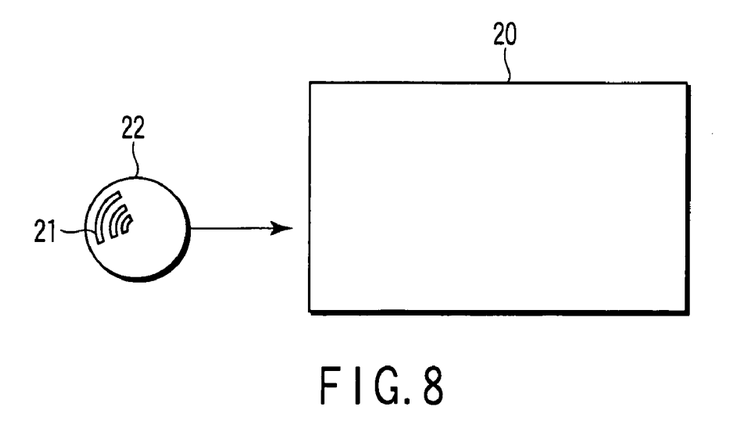
FIG. 8 is a diagram for explanation of a computer program product of the embodiment.

The above mentioned method of the embodiment can be carried out also in a computer program product (e.g., CD-ROM or DVD) 22 that records a program 21 to be performed by a system including a computer 20 as shown in FIG. 8.

For example, a computer program product of the pattern data creation method of the embodiment enables the computer to perform steps S1 to S3, S4 (S4-1 to S4-3), and S5 to S7 (instructions) of FIG. 1 (FIG. 3) of the embodiment.

Another computer program product of the pattern data creation method of the embodiment enables the computer to perform steps S1 and S2-1 to S2-6 (instructions) of FIG. 5.

A further computer program product of the pattern data verification method of the embodiment is obtained by omitting a correction procedure from the computer program product of the pattern data creation method of the embodiment.

These programs are performed by using hardware resources such as a CPU and memories (including an external memory also) of the computer. The CPU reads necessary data from the memories and performs the above-described steps (procedures) on the data. A result of the steps (procedures) is temporarily saved in the memories as required so that it may be read when required by any other steps (procedures).

Further, it is possible to combine the method of extracting a hot spot based on a height dimension (film thickness) according to the above-described embodiment and the conventional method of extracting a hot spot based on a planar dimension (area).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pattern data verification method comprising:
preparing exposure data of mask pattern related to a circuit pattern to be formed on a substrate, the preparing being performed by using a computer;
calculating a characteristic of an image of an exposure pattern on a resist film to be applied on the substrate, the exposure pattern corresponding to the exposure data, the calculating being performed by using the computer;
calculating a film thickness of a resist pattern resulting from developing the resist film based on the characteristic of the image of the exposure pattern, the film thickness of the resist pattern being varied from a thickness of the resist film before being developed, the calculating being performed by using the computer; and
determining whether the exposure data is acceptable or rejectable based on the film thickness of the resist pattern resulting from developing the resist film,
wherein
the exposure data is proximity effect correction applied design data related to the circuit pattern; and
the calculating a characteristic of an image of an exposure pattern comprises performing a calculation based on an intensity distribution of exposure light or charged beam on the resist film corresponding to the exposure pattern obtained by light exposure simulation or charged beam exposure simulation.

2. A pattern data creation method comprising:
preparing design data of mask pattern related to a circuit pattern to be formed on a substrate, the preparing being performed by using a computer;
applying proximity effect correction to the design data;
verifying post proximity effect correction data obtained by applying the proximity effect correction to the design data, comprising using the computer to calculate a characteristic of an image of an exposure pattern on a resist film to be applied on the substrate, the exposure pattern corresponding to the post proximity effect correction data, and to calculate a film thickness of a resist pattern resulting from developing the resist film based on the characteristic of the image of the exposure pattern, the film thickness of the resist pattern being varied from a thickness of the resist film before being developed, and determining whether the post proximity effect correction data is acceptable or rejectable based on the film thickness of the resist pattern resulting from developing the resist film, wherein using the computer to calculate a characteristic of an image of an exposure pattern comprises performing a calculation based on an intensity distribution of exposure light or charged beam on the resist film corresponding to the exposure pattern obtained by light exposure simulation or charged beam exposure simulation;
saving the post proximity effect correction data in a case where the post proximity effect correction data is determined to be acceptable in the verifying the post proximity effect correction data; and
correcting the design data related to the circuit pattern or applying the proximity effect correction to the design data by changing a parameter related to the proximity effect correction or saving the post proximity effect correction data determined to be rejectable in a case where the post proximity effect correction data is determined to be rejectable in the verifying the post proximity effect correction data.

3. The pattern data creation method according to claim 2, wherein in a case where the intensity distribution of the exposure light on the resist film is obtained by the light exposure simulation, the characteristic of the image of the exposure pattern is defined as $Imin \times SIp/Ith$, where $Imin$ is a minimum value of the light intensity distribution on the resist film, $SIp$ is a slope of a waveform of the light intensity distribution, and $Ith$ is a threshold value related to the light intensity distribution.

4. The pattern data creation method according to claim 3, wherein in a case where the $Imin \times SIp/Ith$ is less than a predetermined reference value, the post proximity effect correction data is determined to be rejectable, and in a case where the $Imin \times SIp/Ith$ is the predetermined reference value or more, the post proximity effect correction data is determined to be acceptable.

5. A pattern data creation method comprising:
preparing design data of mask pattern related to a circuit pattern to be formed on a substrate, the preparing being performed by using a computer; and
applying proximity effect correction to the design data, comprising using the computer to calculate a characteristic of an image of an exposure pattern on a resist film to be applied on the substrate, wherein the exposure pattern corresponds to post proximity effect correction data obtained by applying the proximity effect correction to the design data and wherein using the computer to calculate a characteristic of an image of an exposure pattern comprises performing a calculation based on an intensity distribution of exposure light or charged beam on the resist film corresponding to the exposure pattern obtained by light exposure simulation or charged beam exposure simulation, and to calculate a film thickness of a resist pattern resulting from developing the resist film based on the characteristic of the image of the exposure pattern, the film thickness of the resist pattern being varied from a thickness of the resist film before being developed, determining whether the post proximity effect correction data is acceptable or rejectable based on the film thickness of the resist pattern resulting from developing the resist film, saving the post proximity effect correction data in a case where the post proximity effect correction data is determined to be acceptable, and applying the proximity effect correction to the design data by changing a parameter related to the proximity effect correction or saving the post proximity effect correction data determined to be rejectable in a case where the post proximity effect correction data is determined to be rejectable.

6. The pattern data creation method according to claim 5, wherein in a case where the intensity distribution of the exposure light on the resist film is obtained by the light exposure simulation, the characteristic of the image of the exposure pattern is defined as Imin×SIp/Ith, where Imin is a minimum value of the light intensity distribution on the resist film, SIp is a slope of a waveform of the light intensity distribution, and Ith is a threshold value related to the light intensity distribution.

7. The pattern data creation method according to claim 6, wherein in a case where the Imin×SIp/Ith is less than a predetermined reference value, the post proximity effect correction data is determined to be rejectable, and in a case where the Imin×SIp/Ith is the predetermined reference value or more, the post proximity effect correction data is determined to be acceptable.

8. An exposure mask manufacturing method comprising:
preparing post proximity effect correction data determined to be acceptable, the post proximity effect correction data being obtained by a pattern data creation method;
exposing a resist film applied on a substrate based on the post proximity effect correction data;
developing the exposed resist film; and
etching the substrate using the resist film left after the developing as a mask,
wherein the pattern data creation method comprises:
preparing design data of a mask pattern related to a circuit pattern to be formed on a substrate, the preparing being performed by using a computer;
applying proximity effect correction to the design data;
verifying the post proximity effect correction data obtained by applying the proximity effect correction to the design data, comprising using the computer to calculate a characteristic of an image of an exposure pattern on a resist film to be applied on the substrate, the exposure pattern corresponding to the post proximity effect correction data wherein the calculating a characteristic of an image of an exposure pattern comprises performing a calculation based on an intensity distribution of exposure light or charged beam on the resist film corresponding to the exposure pattern obtained by light exposure simulation or charged beam exposure simulation, and to calculate a film thickness of a resist pattern resulting from developing the resist film based on the characteristic of the image of the exposure pattern, the film thickness of the resist pattern being varied from a thickness of the resist film before being developed, and determining whether the post proximity effect correction data is acceptable or rejectable based on the film thickness of the resist pattern resulting from developing the resist film;
saving the post proximity effect correction data in a case where the post proximity effect correction data is determined to be acceptable in the verifying the post proximity effect correction data; and
correcting the design data related to the circuit pattern or applying the proximity effect correction to the design data by changing a parameter related to the proximity effect correction or saving the post proximity effect correction data determined to be rejectable in a case where the post proximity effect correction data is determined to be rejectable in the verifying the post proximity effect correction data.

9. The exposure mask manufacturing method according to claim 8, wherein in a case where the intensity distribution of the exposure light on the resist film is obtained by the light exposure simulation, the characteristic of the image of the exposure pattern is defined as Imin×SIp/Ith, where Imin is a minimum value of the light intensity distribution on the resist film, SIp is a slope of a waveform of the light intensity distribution, and Ith is a threshold value.

10. The exposure mask manufacturing method according to claim 9, wherein in a case where the Imin×SIp/Ith is less than a predetermined reference value, the post proximity effect correction data is determined to be rejectable, and in a case where the Imin×SIp/Ith is the predetermined reference value or more, the post proximity effect correction data is determined to be acceptable.

11. An exposure mask manufacturing method comprising:
preparing post proximity effect correction data determined to be acceptable, the post proximity effect correction data being obtained by pattern data creation method;
exposing a resist film applied on a substrate based on the post proximity effect correction data;
developing the exposed resist film; and
etching the substrate using the resist film left after the developing as a mask,
wherein the pattern data creation method comprises:
preparing design data of mask pattern related to a circuit pattern to be formed on a substrate, the preparing being performed by using a computer; and
applying proximity effect correction to the design data, comprising using the computer to calculate a characteristic of an image of an exposure pattern on a resist film to be applied on the substrate wherein the exposure pattern corresponds to the post proximity effect correction data obtained by applying the proximity effect correction to the design data and wherein the calculating a characteristic of an image of an exposure pattern comprises performing a calculation based on an intensity distribution of exposure light or charged beam on the resist film corresponding to the exposure pattern obtained by light exposure simulation or charged beam exposure simulation, and to calculate a film thickness of a resist pattern resulting from developing the resist film based on the characteristic of the image of the exposure pattern, the film thickness of the resist pattern being varied from a thickness of the resist film before being developed, determining whether the post proximity effect correction data is acceptable or rejectable based on the film thickness of the resist pattern resulting from developing the resist film, saving the post proximity effect correction data in a case where the post proximity effect correction data is determined to be acceptable, and applying the proximity effect correction to the design data by changing a parameter related to the proximity effect correction or saving the post proximity effect correction data determined to be rejectable in a case where the post proximity effect correction data is determined to be rejectable.

12. A semiconductor device manufacturing method comprising:
forming a resist pattern on a substrate including a wafer by lithographic process using an exposure mask, the mask being manufactured by exposure mask manufacturing method; and
forming a pattern by etching the substrate using the resist pattern as a mask,
wherein the exposure mask manufacturing method comprises:
preparing post proximity effect correction data determined to be acceptable, the post proximity effect correction data being obtained by a pattern data creation method;
exposing a resist film applied on the substrate based on the post proximity effect correction data;
developing the exposed resist film; and
etching the substrate using the resist film left after the developing as a mask, wherein the pattern data creation method comprises:
preparing design data of a mask pattern related to a circuit pattern to be formed on a substrate, the preparing being performed by using a computer;
applying proximity effect correction to the design data;
verifying post proximity effect correction data obtained by applying the proximity effect correction to the design data, comprising using the computer to calculate a characteristic of an image of an exposure pattern on a resist film to be applied on the substrate, the exposure pattern corresponding to the post proximity effect correction data, wherein the calculating a characteristic of an image of an exposure pattern comprises performing a calculation based on an intensity distribution of exposure light or charged beam on the resist film corresponding to the exposure pattern obtained by light exposure simulation or charged beam exposure simulation, and to calculate a film thickness of a resist pattern resulting from developing the resist film based on the characteristic of the image of the exposure pattern, the film thickness of the resist pattern being varied from a thickness of the resist film before being developed, and determining whether the post proximity effect correction data is acceptable or rejectable based on the film thickness of the resist pattern resulting from developing the resist film;
saving the post proximity effect correction data in a case where the post proximity effect correction data is determined to be acceptable in the verifying the post proximity effect correction data; and
correcting the design data related to the circuit pattern or applying the proximity effect correction to the design data by changing a parameter related to the proximity effect correction or saving the post proximity effect correction data determined to be rejectable in a case where the post proximity effect correction data is determined to be rejectable in the verifying the post proximity effect correction data.

13. A semiconductor device manufacturing method comprising:
forming a resist pattern on a substrate including a wafer by lithographic process using an exposure mask, the mask being manufactured by exposure mask manufacturing method; and
forming a pattern by etching the substrate using the resist pattern,
wherein the exposure mask manufacturing method comprises:
preparing post proximity effect correction data determined to be acceptable, the post proximity effect correction data being obtained by pattern data creation method;
exposing a resist film applied on the substrate based on the post proximity effect correction data;
developing the exposed resist film; and
etching the substrate using the resist film left after the developing as a mask,
wherein the pattern data creation method comprises:
preparing design data of mask pattern related to a circuit pattern to be formed on the substrate, the preparing being performed by using a computer; and
applying proximity effect correction to the design data, comprising using the computer to calculate a characteristic of an image of an exposure pattern on a resist film to be applied on the substrate wherein the exposure pattern corresponds to post proximity effect correction data obtained by applying the proximity effect correction to the design data and wherein the calculating a characteristic of an image of an exposure pattern comprises performing a calculation based on an intensity distribution of exposure light or charged beam on the resist film corresponding to the exposure pattern obtained by light exposure simulation or charged beam exposure simulation, and to calculate a film thickness of a resist pattern resulting from developing the resist film based on the characteristic of the image of the exposure pattern, the film thickness of the resist pattern being varied from a thickness of the resist film before being developed, determining whether the post proximity effect correction data is acceptable or rejectable based on the film thickness of the resist pattern resulting from developing the resist film, saving the post proximity effect correction data in a case where the post proximity effect correction data is determined to be acceptable, and applying the proximity effect correction to the design data by changing a parameter related to the proximity effect correction or saving the post proximity effect correction data determined to be rejectable in a case where the post proximity effect correction data is determined to be rejectable.

14. A computer program product configured to store program instructions for execution on a computer system enabling the computer system to perform:
an instruction to prepare exposure data of mask pattern related to a circuit pattern to be formed on a substrate;
an instruction to calculate a characteristic of an image of an exposure pattern on a resist film to be applied on the substrate, the exposure pattern corresponding to the exposure data, wherein the exposure data is proximity effect correction applied design data related to the circuit pattern and wherein the calculating a characteristic of an image of an exposure pattern comprises performing a calculation based on an intensity distribution of exposure light or charged beam on the resist film corresponding to the exposure pattern obtained by light exposure simulation or charged beam exposure simulation;
an instruction to calculate a film thickness of a resist pattern resulting from developing the resist film based on the characteristic of the image of the exposure pattern, the film thickness of the resist pattern being varied from a thickness of the resist film before being developed;
an instruction to determining whether the post proximity effect correction data is acceptable or rejectable based on the film thickness of the resist pattern resulting from developing the resist film; and
an instruction to save a result of the instruction to determine whether the exposure data is acceptable or rejectable.

15. A computer program product configured to store program instructions for execution on a computer system enabling the computer system to perform:
an instruction to prepare design data of mask pattern related to a circuit pattern to be formed on a substrate;
an instruction to apply proximity effect correction to the design data;
an instruction to verify post proximity effect correction data obtained by applying the proximity effect correction to the design data, comprising calculating a characteristic of an image of an exposure pattern on a resist film to be applied on the substrate, the exposure pattern corresponding to the post proximity effect correction data wherein the calculating a characteristic of an image of an exposure pattern comprises performing a calculation based on an intensity distribution of exposure light or charged beam on the resist film corresponding to the exposure pattern obtained by light exposure simulation or charged beam exposure simulation, calculating a film thickness of a resist pattern resulting from developing the resist film based on the characteristic of the image of the exposure pattern, the film thickness of the resist pattern being varied from a thickness of the resist film before being developed, and determining whether the post proximity effect correction data is acceptable or rejectable based on the film thickness of the resist pattern resulting from developing the resist film;

an instruction to save the post proximity effect correction data in a case where the post proximity effect correction data is determined to be acceptable in the verifying the post proximity effect correction data; and an instruction to correct the design data related to the circuit pattern or applying the proximity effect correction to the design data by changing a parameter related to the proximity effect correction or saving the post proximity effect correction data determined to be rejectable in a case where the post proximity effect correction data is determined to be rejectable in the verifying the post proximity effect correction data.

16. A computer program product configured to store program instructions for execution on a computer system enabling the computer system to perform:

an instruction to prepare design data of mask pattern related to a circuit pattern to be formed on a substrate; and an instruction to apply proximity effect correction to the design data, comprising calculating a characteristic of an image of an exposure pattern on a resist film to be applied on the substrate, wherein the exposure pattern corresponds to post proximity effect correction data obtained by applying the proximity effect correction to the design data and wherein the calculating a characteristic of an image of an exposure pattern comprises performing a calculation based on an intensity distribution of exposure light or charged beam on the resist film corresponding to the exposure pattern obtained by light exposure simulation or charged beam exposure simulation, calculating a film thickness of a resist pattern resulting from developing the resist film based on the characteristic of the image of the exposure pattern, the film thickness of the resist pattern being varied from a thickness of the resist film before being developed, determining whether the post proximity effect correction data is acceptable or rejectable based on the film thickness of the resist pattern resulting from developing the resist film, saving the post proximity effect correction data in a case where the post proximity effect correction data is determined to be acceptable, and applying the proximity effect correction to the design data by changing a parameter related to the proximity effect correction or saving the post proximity effect correction data determined to be rejectable in a case where the post proximity effect correction data is determined to be rejectable.

* * * * *